(12) United States Patent
Columbia et al.

(10) Patent No.: US 12,321,408 B2
(45) Date of Patent: *Jun. 3, 2025

(54) SYSTEMS AND METHODS FOR FACILITATING THE CREATION OF DIGITAL LABELS TO SUPPLEMENT PRINTED PHYSICAL LABELS

(71) Applicant: Brady Worldwide, Inc., Milwaukee, WI (US)

(72) Inventors: Wesley Columbia, Brown Deer, WI (US); Amandeep Singh Sangha, Thiensville, WI (US); Andrew Bloechl, Jackson, WI (US); Zachary Van Dam, Grafton, WI (US); Nathan Bannow, Milwaukee, WI (US)

(73) Assignee: BRADY WORLDWIDE, INC., Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/510,488

(22) Filed: Nov. 15, 2023

(65) Prior Publication Data

US 2024/0273161 A1   Aug. 15, 2024

Related U.S. Application Data

(63) Continuation of application No. 18/109,209, filed on Feb. 13, 2023, now Pat. No. 11,860,965.

(51) Int. Cl.
*G06F 16/955* (2019.01)
*B41J 3/01* (2006.01)
*B41J 3/407* (2006.01)

(52) U.S. Cl.
CPC .......... *G06F 16/9554* (2019.01); *B41J 3/01* (2013.01); *B41J 3/4075* (2013.01)

(58) Field of Classification Search
CPC .. G06K 7/1473; G06K 7/1417; G06K 7/1443; G06K 7/1482; G06K 19/06037;
(Continued)

(56) References Cited

U.S. PATENT DOCUMENTS 5,450,541 A   9/1995   Rourke et al.
7,605,936 B2   10/2009   Uchida et al.
(Continued)

FOREIGN PATENT DOCUMENTS

WO   2017195970 A1   11/2017
WO   2022204090 A1   9/2022

OTHER PUBLICATIONS

International Search Report and the Written Opinion of the International Searching Authority dated Dec. 21, 2023; International Application No. PCT/US2023/036901.
(Continued)

*Primary Examiner* — Laura A Gudorf
(74) *Attorney, Agent, or Firm* — Thomas M. Hardman

(57) ABSTRACT

A label printing module can be configured to perform at least two actions in response to a request to create a label for an item. The label printing module can create a print job that will produce a physical label for the item. In addition, the label printing module can cause a digital label to be created and stored in a digital label database, which can be accessible via the Internet. The digital label can include an identifier that is uniquely associated with the item to which the physical label corresponds. The digital label can be associated with an Internet address. The Internet address of the digital label can be included in a machine-readable object on the corresponding printed physical label. Someone who has the item corresponding to the printed physical label
(Continued)

can view informational content within the corresponding digital label by using a reader to read the machine-readable object.

20 Claims, 8 Drawing Sheets

(58) Field of Classification Search
CPC ....... G06F 16/9554; B41J 3/01; B41J 3/4075; H04L 67/00
See application file for complete search history.

(56) References Cited

U.S. PATENT DOCUMENTS

| | | |
|---|---|---|
| 7,852,506 B2 | 12/2010 | Kim |
| 9,218,145 B2 | 12/2015 | Stone et al. |
| 2013/0346475 A1* | 12/2013 | Jasperson ............ H04L 67/142 709/203 |
| 2015/0102100 A1 | 4/2015 | Hattrup et al. |
| 2020/0105393 A1 | 4/2020 | Keefe et al. |
| 2020/0193370 A1 | 6/2020 | Kilmer et al. |

OTHER PUBLICATIONS

Extended European Search Report dated Jun. 19, 2024; Application No. 23218739.3—(7) pages.

* cited by examiner

SYSTEMS AND METHODS FOR FACILITATING THE CREATION OF DIGITAL LABELS TO SUPPLEMENT PRINTED PHYSICAL LABELS

CROSS-REFERENCE TO RELATED APPLICATIONS

This application is a continuation of U.S. Non-Provisional patent application Ser. No. 18/109,209, filed Feb. 13, 2023, and titled "Systems and Methods for Facilitating the Creation of Digital Labels to Supplement Printed Physical Labels," the entire contents of which are incorporated herein by reference.

BACKGROUND

The present disclosure is generally related to the creation of labels. Labels have many uses. For example, labels can be applied to products and can include information about a product's origin, manufacturer, safety, shelf-life, use, disposal, and so forth. Warning labels can be attached to a product in order to warn the user about risks associated with the product's use and may include restrictions by the manufacturer or seller on certain uses. Clothing items normally include labels with information about care and treatment. Labels for food and beverages typically include important information related to the contents or ingredients used in a product. Labels can also be used to identify certain types of assets (e.g., computing and networking devices, automobiles, industrial and military equipment). Those skilled in the art will recognize many additional ways that labels can be used.

Labels can be created by a printing system. The printing system can be communicatively coupled to a computing system, and the computing system can include software (e.g., a label printing program) that enables a user of the computing system to control various aspects of the printing system. For example, the software can be used to cause the printing system to print information on unprinted labels, thereby creating printed labels.

There are many different kinds of information that can be printed on a label. Some examples of information include an alphanumeric identifier corresponding to an item to which the label will be affixed, a descriptive name for the item, a picture of the item, a graphical representation of the item, and so forth, including combinations of the foregoing.

There are several challenges associated with conventional labels. For example, many labels are relatively small in size, which means that there is a relatively small amount of information that can be printed on the labels. Under some circumstances, the amount of information that should be printed on a label may exceed the amount of available space on the label. In addition, conventional labels are essentially static. Once a label has been printed, it is difficult (and in some cases impossible) to change the information that is printed on the label or to add new information to the label. Even where it is possible to change the information that is included on a label, it can be extremely difficult to do so. Benefits can be realized by improved techniques for printing labels that address one or more of these challenges.

The subject matter in the background section is intended to provide an overview of the overall context for the subject matter disclosed herein. The subject matter discussed in the background section should not be assumed to be prior art merely as a result of its mention in the background section. Similarly, a problem mentioned in the background section or associated with the subject matter of the background section should not be assumed to have been previously recognized in the prior art.

SUMMARY

The present disclosure is generally related to improved techniques for printing and using labels. The techniques disclosed herein involve the creation and use of digital labels in addition to physical labels.

As used herein, the term "physical label" can refer to a piece of material (e.g., paper, plastic, metal, cloth) that can be affixed to an item. The term "physical label" can also refer to information that is printed directly on an item. Nonlimiting examples of suitable physical labels include adhesive labels, magnetic labels, tags, and combinations thereof.

The term "digital label" can refer to one or more database records that are created in connection with the creation of a physical label, and that are uniquely associated with the item to which the physical label corresponds. Digital labels are stored in a digital label database, which can be accessed via the Internet. The contents of the database record(s) associated with a digital label can be changed over time, as will be described in greater detail below.

Some aspects of the present disclosure can be implemented in a label printing module that is configured to create both physical labels and digital labels for items. The label printing module can be implemented in a variety of different ways. In some embodiments, the label printing module can be a standalone software application. In other embodiments, the label printing module can be implemented as a portion of a software application. For example, the label printing module can be implemented as one or more instructions (e.g., routines, sub-routines, functions, procedures) within a software application. In other embodiments, the label printing module can be implemented as a print driver that can be utilized by a plurality of different software applications. In some embodiments, the label printing module can be a web browser that interacts with a server-based program via the execution of local code (e.g., a JavaScript file). Those skilled in the art will recognize many additional ways that the label printing module can be implemented.

A label printing module that is configured to implement the techniques disclosed herein can run on a computing system that is communicatively coupled to both (i) a printing system that is configured for printing physical labels, and (ii) a digital label database. The label printing module can be communicatively coupled to the digital label database via the Internet.

In accordance with the present disclosure, the label printing module can be configured to perform at least two actions in response to a user request to create a label for an item. One action performed by the label printing module is creating a print job that will produce a physical label associated with the item (e.g., a physical label that can be affixed to the item or printed directly on the item). The label printing module creates the print job and sends the print job to the printing system so that the physical label will be printed. Another action performed by the label printing module is causing a digital label to be created and stored in the digital label database. The digital label can include an identifier that is uniquely associated with the item to which the physical label corresponds. In other words, there can be a one-to-one relationship between the digital label and the item.

Thus, the techniques disclosed herein enable the creation of a printed physical label for an item and a corresponding digital label for the item in a digital label database. Both the printed physical label and the corresponding digital label are generated by the same source (i.e., the label printing module).

As noted above, the digital label database can be accessible via the Internet. When a digital label is created, the digital label can be associated with an Internet address, such as a uniform resource locator (URL). The Internet address of the digital label can be included in the corresponding printed physical label. For example, the Internet address of the digital label can be included within a machine-readable object that is located on the printed physical label. In some embodiments, the machine-readable object can be a barcode. In other embodiments, the machine-readable object can be an identification (ID) tag, such as a near-field communication (NFC) tag, a radio-frequency identification (RFID) tag, or the like.

Someone who has the item corresponding to the printed physical label can obtain the Internet address of the digital label by using a reader (e.g., a barcode reader, an ID tag reader) to read the machine-readable object on the printed physical label. In some embodiments, the reader can be included within a mobile computing device. The Internet address of the digital label can be used (e.g., via a web browser) to obtain informational content associated with the digital label from the digital label database. This informational content can then be displayed to the user.

In some embodiments, a digital label can be created at the same time (or at substantially the same time) as the corresponding printed physical label is created. However, this is not necessary, and in some embodiments the creation of the digital label and the creation of the printed physical label can occur at different times.

Having a digital label in addition to a physical label can address some of the challenges associated with conventional labels (some of which were discussed above). For example, if the amount of information about a particular item (e.g., a product) exceeds the amount of available space on the printed physical label for the item, any additional item information that cannot fit on the printed physical label can be added to a corresponding digital label.

Advantageously, the information that is included in a digital label can be changed over time. This facilitates greater flexibility and allows a wide variety of information to be included in a digital label, including information that was not available when the printed physical label was initially created.

Different types of digital labels can be created for different types of items. For example, a product manufacturer that makes many different types of products can create customized digital labels for each of those products. The manufacturer can choose the specific type of information that is most well-suited for a particular product and can customize the digital label accordingly.

In some embodiments, a cloud computing system for facilitating the creation of digital labels to supplement physical labels is provided. The computing system is communicatively coupled to a printing system and to a digital label database that includes a plurality of digital labels. The computing system includes (i) a processor; and (ii) a label printing module that is executable by the processor to perform a plurality of actions in response to receiving a user request to create a label for an item. The plurality of actions include (i) creating a print job that will cause the printing system to produce a printed physical label associated with the item, wherein the print job is configured such that the printed physical label includes item information and a machine-readable object with an Internet address corresponding to a digital label; and (ii) causing the digital label to be created in the digital label database such that informational content associated with the digital label is accessible via the Internet address, wherein the informational content is related to the item, and wherein the digital label includes an item identifier that is uniquely associated with the item.

In some embodiments, a method for facilitating the creation of digital labels to supplement physical labels is provided. The method is performed by a label printing module running on a computing system that is communicatively coupled to a printing system and to a digital label database. The method is performed in response to receiving a user request to create a label for an item. The method includes (i) creating a print job that will cause the printing system to produce a printed physical label associated with the item, wherein the print job is configured such that the printed physical label includes item information and a machine-readable object including an Internet address corresponding to a digital label; and (ii) causing the digital label to be created in the digital label database such that informational content associated with the digital label is accessible via the Internet address, wherein the informational content is related to the item, and wherein the digital label includes an item identifier that is uniquely associated with the item.

In some embodiments, a computer-readable medium including instructions that are executable by at least one processor to cause a computing system to implement a method for facilitating the creation of digital labels to supplement physical labels is provided. The method is performed by a label printing module running on the computing system. The method is performed in response to receiving a user request to create a label for an item. The method includes (i) creating a print job that will cause a printing system to produce a printed physical label associated with the item, wherein the print job is configured such that the printed physical label includes item information and a machine-readable object including an Internet address corresponding to a digital label; and (ii) causing the digital label to be created in a digital label database such that informational content associated with the digital label is accessible via the Internet address, wherein the informational content is related to the item, and wherein the digital label includes an item identifier that is uniquely associated with the item.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
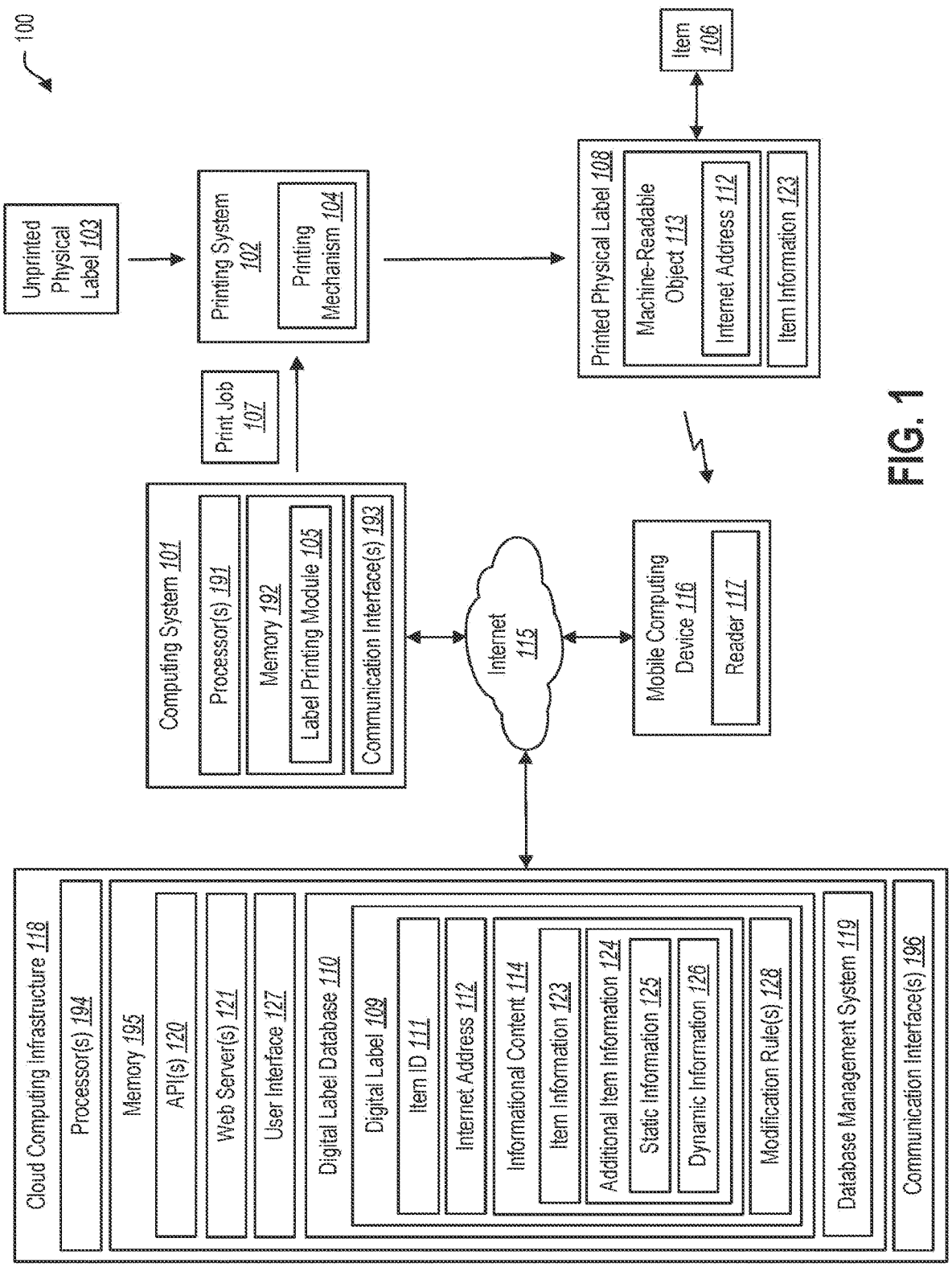
FIG. 1 illustrates an example of a system in which the techniques disclosed herein can be utilized, the system including a label printing module that is communicatively coupled to a printing system and to a digital label database.

FIG. 1 illustrates an example of a system 100 in which the techniques disclosed herein can be utilized. The system 100 includes a computing system 101 that is communicatively coupled to a printing system 102. The printing system 102 is configured to print information on physical labels. FIG. 1 shows an unprinted physical label 103 being provided as input to the printing system 102.

The printing system 102 includes a printing mechanism 104 that is configured to make a persistent representation of text, graphics, or other indicia on a substrate, such as the unprinted physical label 103. For example, the printing mechanism 104 can be configured to print a barcode on the unprinted physical label 103. There are a variety of different printing technologies that the printing mechanism 104 can be configured to utilize. In some embodiments, the printing mechanism 104 can be configured to utilize thermal printing technology by selectively heating regions of a heat-sensitive substrate. Alternatively, in other embodiments, the printing mechanism 104 can be configured to utilize another type of printing technology, such as dye sublimation, laser printing, inkjet printing, or the like.

The computing system 101 includes a label printing module 105 that enables a user of the computing system 101 to control various aspects of the printing system 102. In accordance with the present disclosure, the label printing module 105 can be configured to create both physical labels and digital labels for items, such as the item 106 shown in FIG. 1. As noted above, the label printing module 105 can be implemented in a variety of different ways (e.g., a standalone software application, a portion of a software application, a print driver, a web browser). In some embodiments, at least some of the functionality of the label printing module 105 described herein can be implemented via the combination of a web browser running on the computing system 101 executing local code (e.g., one or more JavaScript files) that interacts with one or more server-side programs (e.g., program(s) running within the cloud computing infrastructure 118). Thus, the label printing functionality described herein (including the creation of a digital label 109 in connection with the creation of a printed physical label 108) can be implemented via a web-based solution, without the need for additional specialized software (other than a web browser) to run on the computing system 101.

The label printing module 105 can be configured so that a user of the computing system 101 can input (or otherwise submit) to the label printing module 105 a request to create a label for an item 106. The label printing module 105 can be configured to perform at least two actions in response to such a request.

One action performed by the label printing module 105 in response to a request to create a label for an item 106 is creating a print job 107 that will produce a printed physical label 108 associated with the item 106. The printed physical label 108 can be affixed to the item 106 or printed directly on the item 106. The label printing module 105 creates the print job 107 and sends (or otherwise submits) the print job 107 to the printing system 102 so that the printed physical label 108 will be created.

Another action performed by the label printing module 105 in response to a request to create a label for an item 106 is causing a digital label 109 to be created in a digital label database 110. The digital label 109 includes one or more database records in the digital label database 110. Each database record can include one or more fields.

Thus, the techniques disclosed herein enable the creation of a printed physical label 108 for an item 106 and a corresponding digital label 109 for the item 106 in a digital label database 110. Both the printed physical label 108 and the corresponding digital label 109 are generated by the same source (i.e., the label printing module 105).

In some embodiments, the digital label 109 can be created at the same time (or at substantially the same time) as the printed physical label 108 is created. For example, the label printing module 105 can cause the digital label 109 to be created in the digital label database 110 when the label printing module 105 is creating the print job 107 for the printed physical label 108 and submitting the print job 107 to the printing system 102. However, it is not necessary for the digital label 109 to be created at the same time as the printed physical label 108, and in some embodiments the creation of the digital label 109 and the creation of the printed physical label 108 can occur at different times.

Both the printed physical label 108 and the digital label 109 can be uniquely associated with the item 106. In other words, there can be a one-to-one relationship between the printed physical label 108 and the item 106. There can also be a one-to-one relationship between the digital label 109 and the item 106.

In some embodiments, the digital label 109 can include (or otherwise be associated with) an item identifier (ID) 111. The item ID 111 can be uniquely associated with the item 106. For example, the item 106 could be a product and the item ID 111 could be a serial number associated with the product. Of course, those skilled in the art will recognize other types of item IDs 111 that can be assigned to items 106 in accordance with the techniques disclosed herein.

The digital label database 110 can be stored on one or more computing systems that are distinct from the computing system 101 on which the label printing module 105 is running. In some embodiments, the digital label database 110 can be located in the "cloud." FIG. 1 represents this by showing the digital label database 110 as being included within a cloud computing infrastructure 118. The cloud computing infrastructure 118 includes a combination of computing hardware and software that is maintained and operated by a cloud computing provider for the purpose of providing cloud computing services. Examples of such cloud computing services include Microsoft Azure and Amazon Web Services. The computing system 101 on which the label printing module 105 runs can be communicatively coupled to the cloud computing infrastructure 118 (and the digital label database 110 that is maintained on the cloud computing infrastructure 118) via the Internet 115.

In embodiments where the digital label database 110 is included within a cloud computing infrastructure 118, the digital label database 110 can be part of a public cloud or a private cloud. A cloud is called a "public cloud" when the cloud computing infrastructure 118 is operated for public use. In a "private cloud" the cloud computing infrastructure 118 can be operated solely for a single organization. In a private cloud the cloud computing infrastructure 118 can be managed internally or by a third party, and the cloud computing infrastructure 118 can be hosted either internally or externally.

The system 100 includes a database management system 119 that is configured to manage the digital label database 110. In embodiments where the digital label database 110 is included within a cloud computing infrastructure 118, the database management system 119 can also be included within the cloud computing infrastructure 118.

The system 100 can also include one or more application programming interfaces (APIs) 120. The API(s) 120 can be exposed to other entities, such as the label printing module 105, via the Internet 115. In some embodiments, the APIs 120 can be included within the cloud computing infrastructure 118. The label printing module 105 can utilize the API(s) 120 to create and update digital labels 109 in the digital label database 110. Some examples showing communication that can occur between the label printing module 105 and the database management system 119 in order to create a digital label 109 in the digital label database 110 and also to subsequently update the digital label 109 will be described below. The API(s) 120 can also facilitate multi-tenancy, which will also be described below.

In some embodiments, the label printing module 105, the digital label database 110, and the API(s) 120 can all be part of the same database solution. In other words, each of these software components can be provided by a single entity as part of the same package. Customers who purchase or license the package can run the label printing module 105 on a local computing system 101 and also create digital labels 109 in the digital label database 110, as will be described below.

The digital label 109 can be associated with an address. The address can be an Internet address 112, such as a uniform resource locator (URL). As will be described in greater detail below, associating the digital label 109 with an Internet address 112 means that at least some aspects of the digital label 109 can be accessed via the Internet 115.

The digital label 109 includes informational content 114. In general terms, the informational content 114 is information about the item 106 with which the digital label 109 is associated. The digital label database 110 can be configured such that anyone who has the Internet address 112 of the digital label 109 is able to view the informational content 114 in the digital label 109 (e.g., via a web browser).

There are many different kinds of informational content 114 that can be included in a digital label 109. The type of informational content 114 can depend on the type of item 106 corresponding to the digital label 109. For example, suppose that the item 106 is a product. Some examples of informational content 114 that can be included in a digital label 109 for a product include product specifications, an instruction manual, a video about how to install or service the product, and so forth.

The system 100 includes one or more web servers 121 that are configured to receive and respond to requests for the informational content 114 associated with a digital label 109. In some embodiments, the web server(s) 121 can be implemented within the cloud computing infrastructure 118. In some embodiments, the web server(s) 121 can be included within applications that are created via services provided by the cloud computing infrastructure 118.

The Internet address 112 of the digital label 109 can be included in the printed physical label 108. There are many different ways that this can be implemented. For example, the Internet address 112 of the digital label 109 can be included within a machine-readable object 113 that is located on (or otherwise affixed to) the printed physical label 108. In some embodiments, the machine-readable object 113 can be a barcode. In such embodiments, the Internet address 112 of the digital label 109 can be included in a barcode that is printed on the printed physical label 108. In other embodiments, the machine-readable object 113 can be an identification (ID) tag. In such embodiments, the Internet address 112 of the digital label 109 can be included in an ID tag that is affixed to, embedded within, or otherwise associated with the printed physical label 108. Examples of ID tags include near-field communication (NFC) tags and radio-frequency identification (RFID) tags. In such embodiments, the digital label 109 may be read by a machine-readable object 113, even after the text, graphics, or other indicia on the printed physical label 108 fade or wear off after the printed physical label 108 is exposed to wear and tear and/or environmental conditions. In some embodiments, the Internet address 112 of the digital label 109 can be included within a machine-readable object 113 that is a barcode and an ID tag. In such embodiments, the printed physical label 108 has both a barcode printed on the printed physical label 108 and an ID tag that is affixed to, embedded within, or otherwise associated with the printed physical label 108.

The specific types of machine-readable objects 113 discussed above should not be interpreted as limiting the scope of the present disclosure. Those skilled in the art will recognize many additional types of machine-readable objects 113 that can include the Internet address 112 of the digital label 109 and that can be included on, affixed to, or otherwise associated with a printed physical label 108 in accordance with the present disclosure.

In some embodiments, the Internet address 112 of the digital label 109 can include the full-length URL associated with the digital label 109. In other embodiments, the Internet address 112 of the digital label 109 can take the form of a shortened version of the URL associated with the digital label 109. The label printing module 105 can utilize a URL shortening web service (e.g., TinyURL) to create the shortened version of the URL. Utilizing a shortened version of the URL instead of a full-length URL can be beneficial because it allows the machine-readable object 113 to be less complex and potentially smaller than it would be if a full-length URL were utilized. For example, in embodiments where the machine-readable object 113 is a barcode, one potential benefit of utilizing a shortened version of the URL associated with the digital label 109 is the ability to use a smaller and/or less complex barcode on the printed physical label 108, thereby enabling the printed physical label 108 itself to occupy less space on the item 106.

The Internet address 112 of the digital label 109 can be obtained by using a reader 117 to read the machine-readable object 113 on the printed physical label 108. In some embodiments, the reader 117 can be included within a mobile computing device 116 (e.g., a smartphone, a tablet computing device). Alternatively, the reader 117 can be included within another type of electronic device. Alternatively still, the reader 117 can be a standalone device.

The type of reader 117 that should be used depends on the type of machine-readable object 113 in the printed physical label 108. For example, if the machine-readable object 113 is a barcode, then the reader 117 can be a barcode reader. As another example, if the machine-readable object 113 is an ID tag, then the reader 117 can be an ID tag reader. Those skilled in the art will recognize other types of readers 117 that can be used depending on the type of machine-readable object 113 that is included on, affixed to, or otherwise associated with the printed physical label 108.

One possible scenario in which a user of the mobile computing device 116 views the informational content 114 within a digital label 109 will now be described. The user of the mobile computing device 116 can obtain the item 106 that includes the printed physical label 108. The reader 117 within the mobile computing device 116 can then be used to read the machine-readable object 113 in order to obtain the Internet address 112 of the digital label 109. The Internet address 112 of the digital label 109 can be automatically provided to a web browser running on the mobile computing device 116. The web browser can send a request (e.g., an HTTP GET request) to the web server 121. The request can include the Internet address 112 of the digital label 109. In response to receiving the request, the web server 121 can return the informational content 114 associated with the digital label 109 to the mobile computing device 116. This informational content 114 can then be displayed to the user of the mobile computing device 116 via the web browser.

The printed physical label 108 includes certain information about the item 106. This information may be referred to herein as item information 123. There are many different types of item information 123 that can be included on the printed physical label 108. Some examples of item information 123 include information related to the origin, manufacturer, safety, shelf-life, use, and/or disposal of the item 106.

The informational content 114 that is included in (or otherwise associated with) the digital label 109 can include the item information 123 that is included on the printed physical label 108. The informational content 114 associated with the digital label 109 can also include additional item information 124 that is not included on the printed physical label 108. The additional item information 124 can include information about the item 106 that is not included on the printed physical label 108 due to a lack of space and/or other constraints.

As noted above, having a place to store additional item information 124 that cannot be included on the printed physical label 108 can be beneficial in a variety of different scenarios. For example, suppose that the item 106 is a product. If the amount of product information that the manufacturer would like to communicate to customers exceeds the amount of available space on the printed physical label 108, any additional product information that cannot fit on the printed physical label 108 can be added to the corresponding digital label 109. A customer who wishes to access this additional product information can do so by using an appropriate device (e.g., a reader 117) to read the machine-readable object 113 on the printed physical label 108 and obtain the informational content 114 in the digital label 109.

In the embodiment shown in FIG. 1, the informational content 114 within the digital label 109 includes both the item information 123 that is included on the printed physical label 108 as well as additional item information 124 that is not included on the printed physical label 108. In an alternative embodiment, the digital label 109 may be configured so that it includes the additional item information 124 but does not include the item information 123 that is included on the printed physical label 108.

The additional item information 124 in the digital label 109 can include both static information 125 and dynamic information 126. The static information 125 is information about the item 106 that is fixed and cannot be changed after it is initially created and associated with the digital label 109. The dynamic information 126 is information about the item 106 that can be changed over time.

The dynamic information 126 within the digital label 109 can be changed via a user interface 127. Some examples illustrating how this can occur will be described below. The user interface 127 can be implemented in a variety of different ways. In some embodiments, the user interface 127 can include one or more web pages that are accessible via a web browser. Alternatively, or in addition, the user interface 127 can be accessible via the label printing module 105.

In an alternative embodiment, all of the informational content 114 in the digital label 109 can be dynamic information 126 that can be changed over time. In another alternative embodiment, all of the content in the digital label 109 (both the informational content 114 and other content, such as the item ID 111 and the Internet address 112) can be dynamic information 126 that can be changed over time.

Having the ability to change at least some of the informational content 114 associated with the digital label 109 can be beneficial in a wide variety of scenarios. For example, a manufacturer or seller of an item 106 (e.g., a product) could decide to offer some type of promotion in relation to the item 106 (e.g., a discount coupon), and information about the promotion could be added to the informational content 114 associated with the digital label 109 at the relevant time.

As another example, suppose that at some point after the initial creation of a printed physical label 108 and a corresponding digital label 109 for an item 106, problems are detected such that the item 106 needs to be recalled. Because the digital label 109 can be changed over time, information notifying the end user about the recall (e.g., a red flag accompanied by an explanatory note) can be added to the informational content 114 associated with the digital label 109 at some point in time after the printed physical label 108 and the digital label 109 are initially created.

In some embodiments, the dynamic information 126 associated with the digital label 109 can include a form that can be filled out and submitted by a person who is viewing the informational content 114 associated with the digital label 109. For example, the digital label 109 associated with a product could include a form that enables customers to request service and/or replacement parts. A related message can be added to the printed physical label 108 in order to notify a customer or end user about this capability (e.g., "Scan this code to request service.").

Under some circumstances, the creator of a digital label 109 can allow others to modify and/or add certain information to the digital label 109 (e.g., modify and/or add to the dynamic information 126 associated with the digital label 109), thereby enabling a wide range of user interactivity. For example, a product manufacturer could allow customers to perform maintenance logging by adding maintenance records to a digital label 109 associated with a product. A related message can be added to the printed physical label 108 in order to notify a customer or end user about this capability (e.g., "Scan this code to indicate the date and type of service that is performed on this product."). In this way, the digital label 109 can be used to create and maintain a complete history of the service that is performed in connection with the product.

To prevent unauthorized modification of a digital label 109, one or more modification rules 128 can be associated with a digital label 109. In general, a modification rule 128 defines a condition that must be satisfied in order for modification of a digital label 109 to be permitted. If there are a plurality of modification rules 128 associated with a digital label 109, each of the modification rules 128 may need to be satisfied in order for modification of the digital label 109 to be permitted.

Many different types of modification rules 128 can be defined in accordance with the present disclosure. In some embodiments, a modification rule 128 can define what users are permitted to modify a digital label 109. Alternatively, or in addition, a modification rule 128 can define what content (e.g., what database records and/or what database fields) within the digital label 109 can be modified. For example, a modification rule 128 can indicate that certain informational content 114 (e.g., static information 125) cannot be changed but other informational content 114 (e.g., dynamic information 126) can be changed.

For the sake of simplicity, the system 100 shown in FIG. 1 includes one item 106 associated with one printed physical label 108 and one digital label 109. However, those skilled in the art will recognize that the techniques disclosed herein can be utilized to create a plurality of printed physical labels and a plurality of corresponding digital labels for a plurality of items.

The computing system 101 includes at least one processor 191 and memory 192 communicatively coupled to the processor(s) 191. The label printing module 105 is stored in the memory 192. More specifically, the label printing module 105 includes a plurality of instructions that are stored in the memory 192 and executable by the processor(s) 191 to perform the operations that are described herein in relation to the label printing module 105.

The computing system 101 includes at least one communication interface 193. The communication interface(s) 193 enable the computing system 101 to communicate with the printing system 102 and with the digital label database 110 (or, more specifically, the database management system 119 corresponding to the digital label database 110) via the Internet 115.

The cloud computing infrastructure 118 also includes at least one processor 194 and memory 195 communicatively coupled to the processor(s) 194. The cloud computing infrastructure 118 also includes at least one communication interface 196 that enables the computing system 101 to communicate with the cloud computing infrastructure 118 via the Internet 115.

Figure 2:
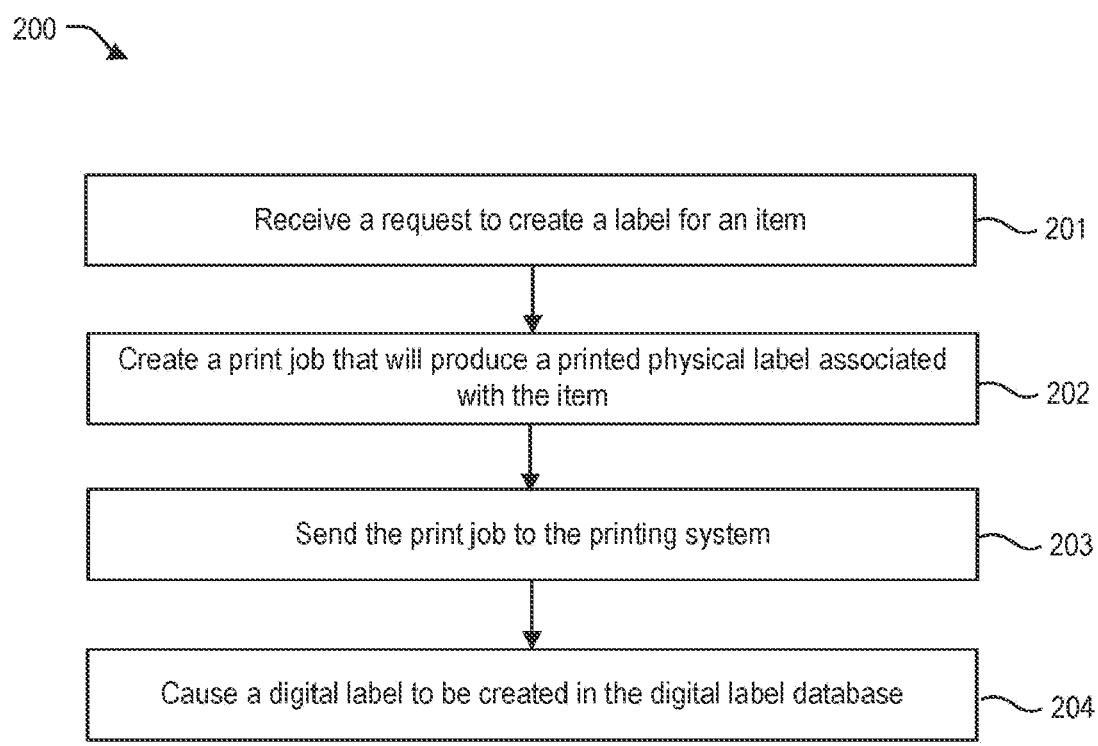
FIG. 2 illustrates a method showing certain actions that can be performed by the label printing module in accordance with some embodiments of the present disclosure.

FIG. 2 illustrates a method 200 showing certain actions that can be performed by the label printing module 105 in accordance with some embodiments of the present disclosure.

At 201, the label printing module 105 receives a request to create a label for an item 106. The request can be received via a user interface of the label printing module 105. The remaining actions of the method 200 can be performed in response to receiving this request.

At 202, the label printing module 105 creates a print job 107 that will produce a printed physical label 108 associated with the item 106. The print job 107 can be configured such that the printed physical label 108 can be affixed to the item 106 or printed directly on the item 106. In addition, the print job 107 can be configured such that the Internet address 112 of the digital label 109 is included in the printed physical label 108. For example, the Internet address 112 of the digital label 109 can be included in a machine-readable object 113 that is located on, affixed to, or otherwise associated with the printed physical label 108 (as described above). At 203, the label printing module 105 sends the print job 107 to the printing system 102 so that the printed physical label 108 will be created.

At 204, the label printing module 105 causes a digital label 109 to be created in a digital label database 110. As noted above, in some embodiments the digital label 109 can be created at the same time (or at substantially the same time) as the printed physical label 108 is created. The digital label 109 can be uniquely associated with the item 106 to which the printed physical label 108 corresponds. The digital label 109 can include informational content 114, and the digital label database 110 can be configured such that anyone who has the Internet address 112 of the digital label 109 is able to view the informational content 114 in the digital label 109 (e.g., via a web browser). Because the Internet address 112 of the digital label 109 is included in the printed physical label 108, the informational content 114 in the digital label 109 can be obtained by using a reader 117 to read the machine-readable object 113 on the printed physical label 108, as described above.

Figure 3:
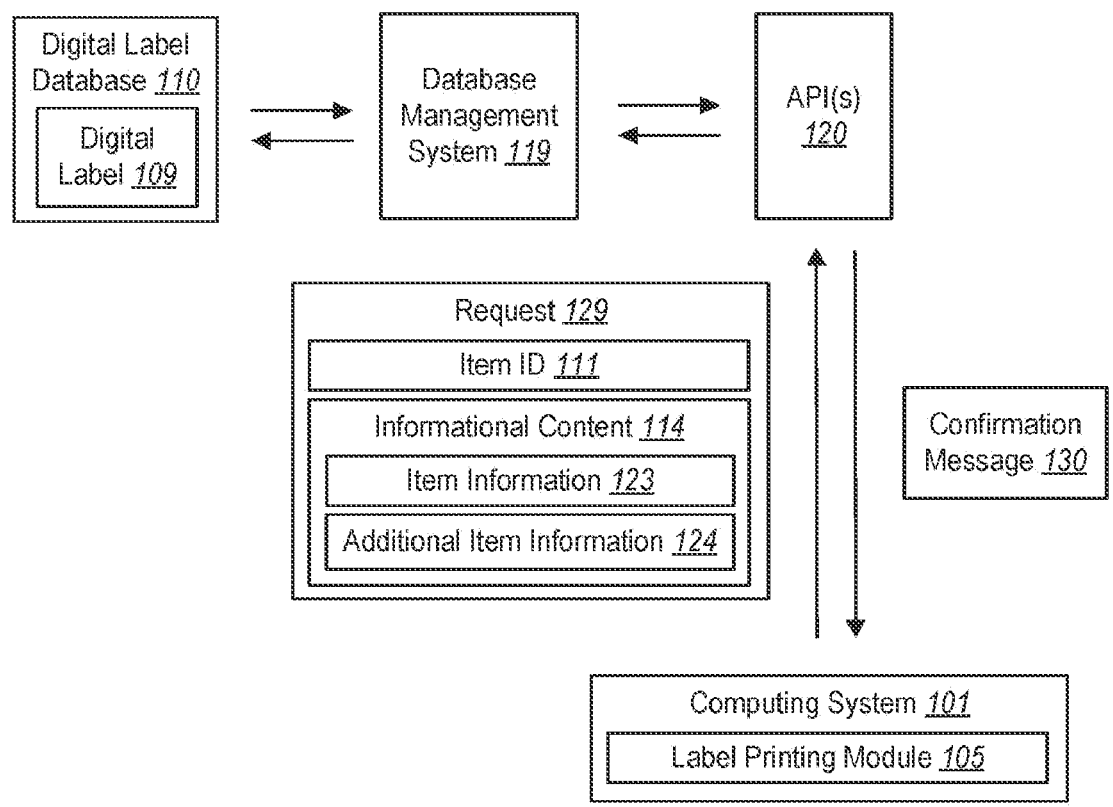
FIG. 3 illustrates an example showing communication that can occur between the label printing module and a database management system in order to cause a digital label to be created in the digital label database.

FIG. 3 illustrates an example of the types of communication that can occur between the label printing module 105 and the database management system 119 in order to cause a digital label 109 to be created in the digital label database 110. In other words, FIG. 3 shows one way that the action 204 in the method 200 of FIG. 2 can be performed. The communication shown in FIG. 3 can occur via one or more APIs 120 that have been created and exposed to the label printing module 105 in order to facilitate communication with the database management system 119.

The label printing module 105 can send a request 129 to the database management system 119 to create the digital label 109. In some embodiments, the request 129 can include the item ID 111 and the informational content 114 that should be associated with the digital label 109. As discussed above, the informational content 114 can include the item information 123 and/or the additional item information 124. In an alternative embodiment, the request 129 can include the informational content 114 but not the item ID 111. In such an embodiment, the database management system 119 can create the item ID 111 for the digital label 109.

In response to receiving the request 129 from the label printing module 105, the database management system 119 can create the digital label 109 in the digital label database 110. In some embodiments, once the digital label 109 has been created, the database management system 119 can send a confirmation message 130 to the label printing module 105 indicating that the digital label 109 has been created.

Figure 4:
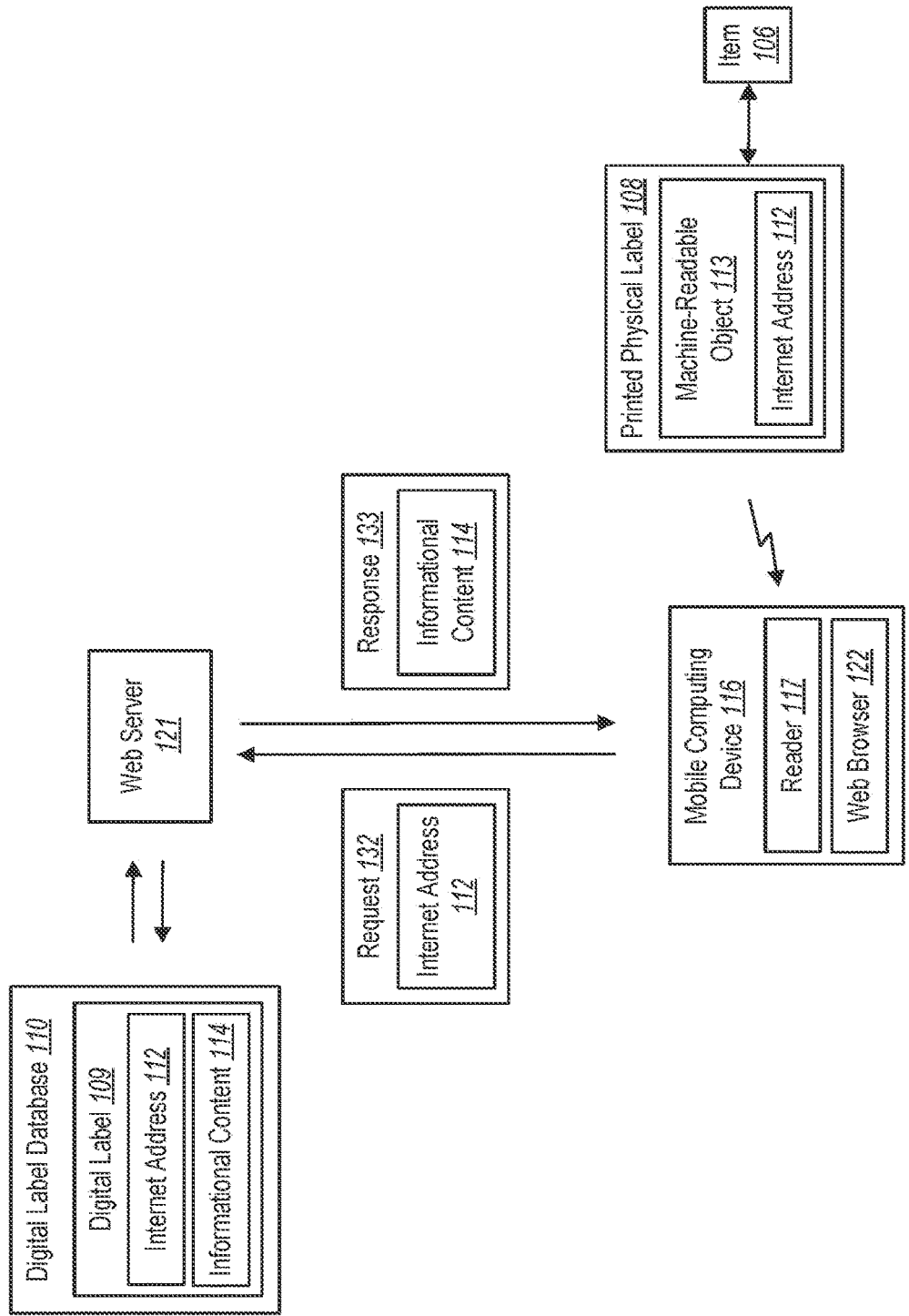
FIG. 4 illustrates an example showing one way that a user of a mobile computing device can view informational content within a digital label.

FIG. 4 illustrates an example showing one way that a user of the mobile computing device 116 can view the informational content 114 within a digital label 109. In the depicted example, the user of the mobile computing device 116 obtains the item 106 with the corresponding printed physical label 108. The reader 117 within the mobile computing device 116 can then be used to read the machine-readable object 113 in order to obtain the Internet address 112 of the digital label 109.

The Internet address 112 of the digital label 109 can be automatically provided to a web browser 122 running on the mobile computing device 116. The web browser can send a request 132 to the web server 121. The request 132 can include the Internet address 112 of the digital label 109. In some embodiments, the request 132 can be an HTTP GET request.

In response to receiving the request 132, the web server 121 can identify the digital label 109 in the digital label database 110 based on the Internet address 112 that is included in the request 132. The web server 121 can obtain the informational content 114 associated with the digital label 109 from the digital label database 110. The web server 121 can then send a response 133 to the request 132 back to the mobile computing device 116. The response 133 can include the informational content 114 associated with the digital label 109. This informational content 114 can then be displayed to the user of the mobile computing device 116 via the web browser.

Figure 5:
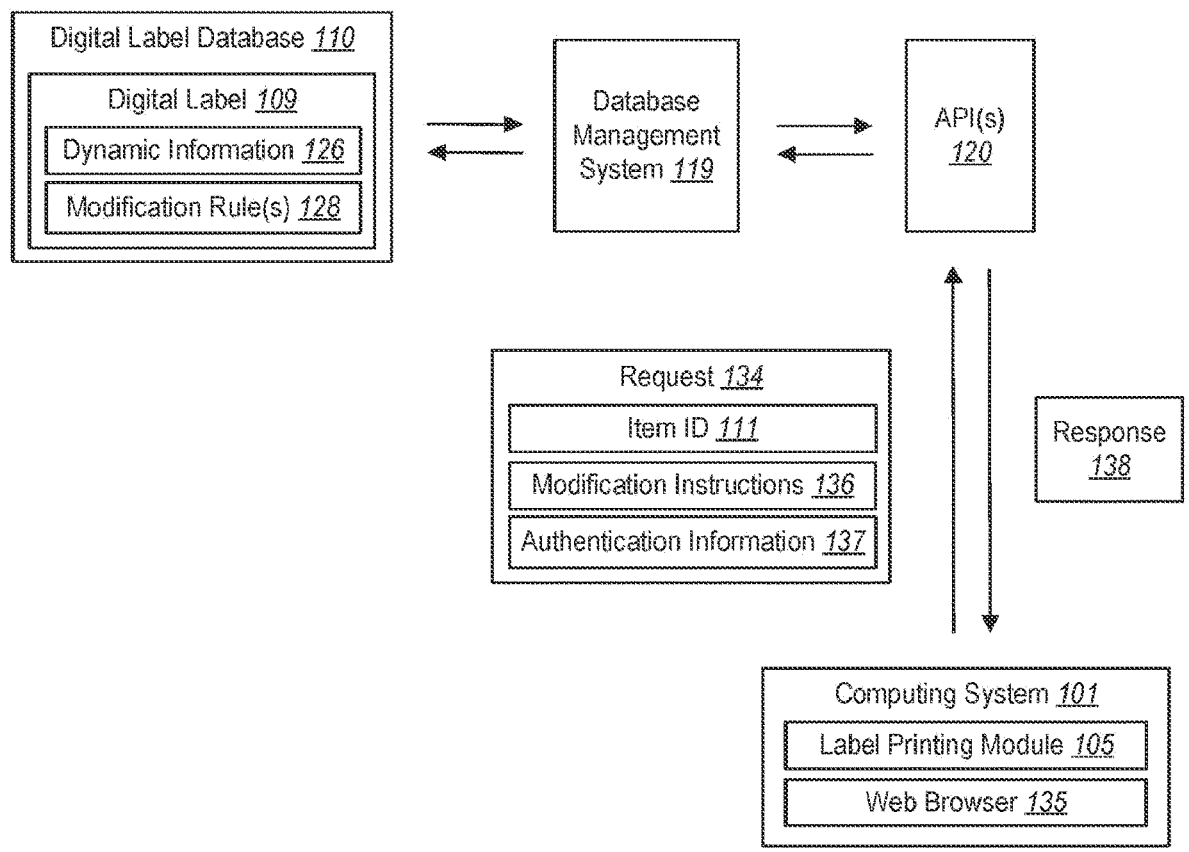
FIG. 5 illustrates an example showing how the contents of a digital label can be changed over time.

As noted above, at least some of the contents of a digital label 109 (such as the dynamic information 126) can be changed over time. FIG. 5 illustrates an example showing one way that this can occur.

In the depicted example, it will be assumed that the contents of the digital label 109 are being changed by the user of the computing system 101 on which the label printing module 105 is running. Alternatively, a different computing system could be used to change the contents of the digital label 109.

The example shown in FIG. 5 involves communication between the computing system 101 and the database management system 119. In some embodiments, this communication can occur via one or more APIs 120 that have been created and exposed to facilitate communication with the database management system 119.

The user of the computing system 101 can send a request 134 to the database management system 119 to modify the digital label 109. In some embodiments, the request 134 can be sent via a web browser 135 running on the computing system 101. Alternatively, the request 134 can be sent via the label printing module 105.

The request 134 can include a unique ID associated with the digital label 109, such as the item ID 111. The request 134 can also include modification instructions 136. The modification instructions 136 are instructions for modifying the digital label 109. The modification instructions 136 can identify the specific database records and/or database fields in the digital label 109 that should be changed. In some embodiments, the modification instructions 136 identify specific database records and/or database fields among the dynamic information 126 associated with the digital label 109. The modification instructions 136 can also identify the specific changes that should be made to the identified database records and/or database fields. For example, the modification instructions 136 can identify the information that should be deleted from and/or added to the identified database records and/or database fields.

In response to receiving the request 134, the database management system 119 can determine whether making the requested change(s) would violate any modification rules 128 associated with the digital label 109. If making the requested change(s) would not violate any modification rules 128 associated with the digital label 109, then the database management system 119 can grant the request 134 and make the requested change(s). On the other hand, if making the requested change(s) would violate at least one modification rule 128 associated with the digital label 109, then the database management system 119 can deny the request 134.

Under some circumstances, determining whether making the requested change(s) would violate any modification rules 128 associated with the digital label 109 can involve authenticating the user who is making the request 134. In the depicted example, the user who is making the request 134 is the user of the computing system 101. Thus, the request 134 can include authentication information 137 associated with the user of the computing system 101.

After the request 134 has been processed, the database management system 119 can send a response 138 back to the computing system 101. The response 138 can indicate whether the request 134 was granted or denied, and whether the requested change(s) have been made.

Figure 6:
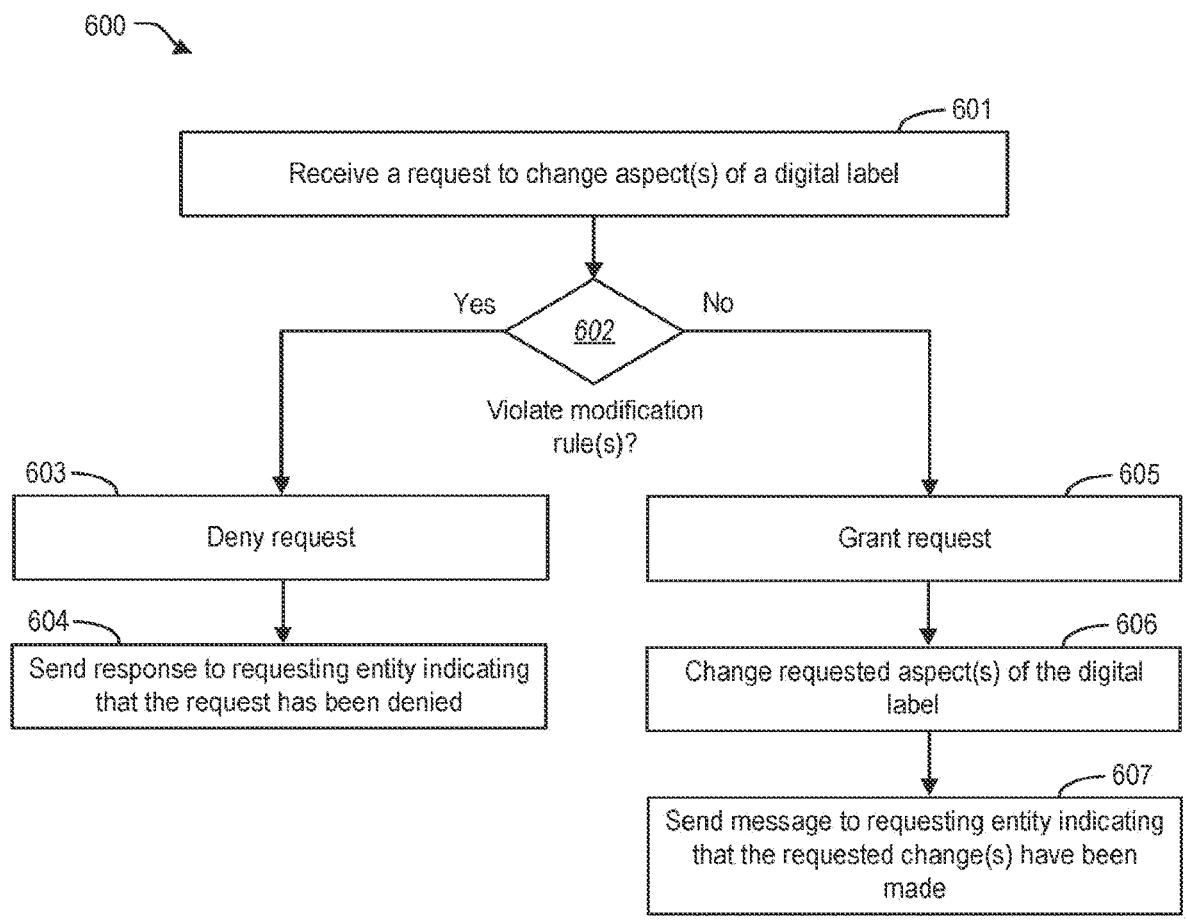
FIG. 6 illustrates a method showing how a request to modify a digital label can be handled by the database management system in accordance with some embodiments of the present disclosure.

FIG. 6 illustrates a method 600 showing how a request 134 to modify a digital label 109 can be handled by the database management system 119 in accordance with some embodiments of the present disclosure.

At 601, a request 134 to change one or more aspects of a digital label 109 is received by the database management system 119. The request 134 can be a request 134 to change some of the informational content 114 associated with the digital label 109. In some embodiments, the request 134 can be received via an API 120 that has been created and exposed to facilitate communication with the database management system 119. In some embodiments, the request 134 can be received from a web browser 135. Alternatively, the request 134 can be received from the label printing module 105.

At 602, a determination can be made about whether granting the request 134 would violate any of the modification rule(s) 128 associated with the digital label 109. If it is determined that granting the request 134 would violate at least one modification rule 128, then at 603 the request 134 is denied and at 604 a response 138 is sent to the requesting entity (e.g., the computing system 101) indicating that the request 134 has been denied.

On the other hand, if at 602 it is determined that granting the request 134 would not violate any modification rules 128, then at 605 the request 134 is granted. At 606, the change(s) to the aspect(s) of the digital label 109 are made in accordance with the request 134, and at 607 a response 138 is sent to the requesting entity indicating that the requested change(s) have been made.

As noted above, the API(s) 120 can be configured to facilitate multi-tenancy. In general, multi-tenancy refers to a mode of operation of software in which a plurality of independent instances of one or multiple applications operate in a shared environment. In the context of the techniques disclosed herein, multi-tenancy refers to a mode of operation of the system 100 in which a plurality of independent instances of the digital label database 110 operate in a shared environment, such as a cloud computing environment provided by the cloud computing infrastructure 118.

Figure 7:
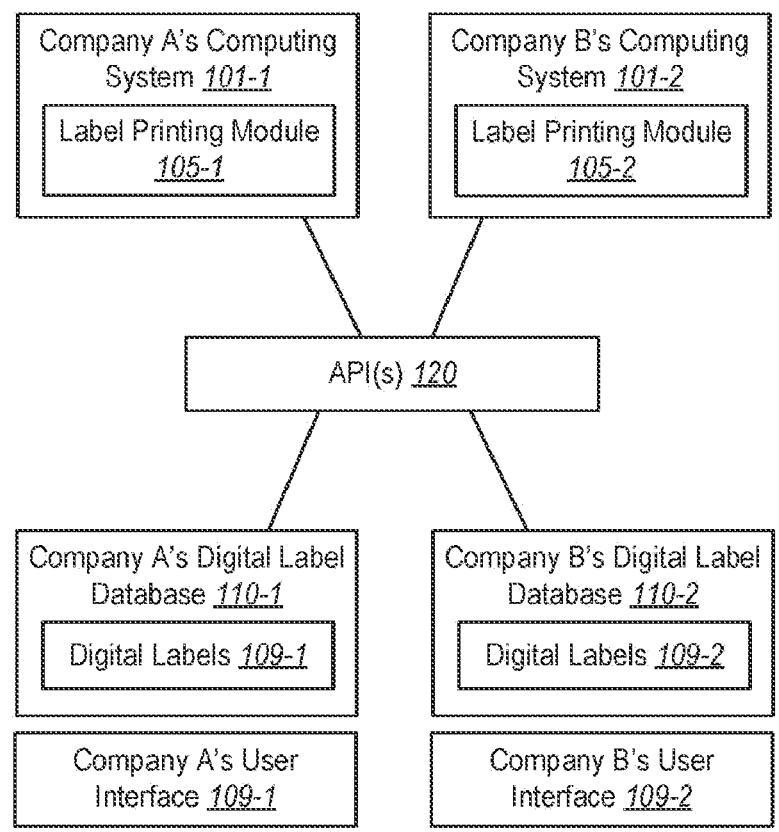
FIG. 7 illustrates aspects of another system in which the techniques disclosed herein can be utilized.

FIG. 7 illustrates an example showing how multi-tenancy can be implemented in the system 100 of FIG. 1. In the depicted example, it will be assumed that there are two different companies, which will be referred to as Company A and Company B. A digital label database 110-1 is created for Company A, and a digital label database 110-2 is created for Company B. The digital label databases 110-1, 110-2 are independent instances of the digital label database 110. The digital label databases 110-1, 110-2 operate in the shared environment provided by the cloud computing infrastructure 118.

The API(s) 120 are configured to facilitate multi-tenancy by limiting access to Company A's digital label database 110-1 to users who are associated with Company A. Similarly, the API(s) 120 limit access to Company B's digital label database 110-2 to users who are associated with Company B. In other words, only users associated with Company A are able to add digital labels 109-1 to Company A's digital label database 110-1, and only users associated with Company B are able to add digital labels 109-2 to Company B's digital label database 110-2.

FIG. 7 shows a computing system 101-1 at Company A's premises and a computing system 101-2 at Company B's premises. Company A's computing system 101-1 includes a label printing module 105-1, and Company B's computing system 101-2 includes another label printing module 105-2. The API(s) 120 ensure that the label printing modules 105-1, 105-2 access the appropriate digital label database. When someone at Company A uses Company A's computing system 101-1 to create a printed physical label, the label printing module 105-1 calls the API(s) 120 to create a corresponding digital label 109-1. The API(s) 120 ensure that the digital label 109-1 is created in Company A's digital label database 110-1. Similarly, when someone at Company B uses Company B's computing system 101-1 to create a printed physical label, the label printing module 105-2 calls the API(s) 120 to create a corresponding digital label 109-2. The API(s) 120 ensure that the digital label 109-2 is created in Company B's digital label database 110-2. The API(s) 120 may require users to present appropriate credentials in order to gain access to a particular digital label database.

Similar techniques can be applied when a user wants to modify an existing digital label. The API(s) 120 can ensure that digital labels 109-1 in Company A's digital label database 110-1 can only be modified by users who are associated with Company A and who have the appropriate permission level, and that digital labels 109-2 in Company B's digital label database 110-2 can only be modified by users who are associated with Company B and who have the appropriate permission level.

In some embodiments, the API(s) 120 can also facilitate the creation of different user interfaces associated with different digital label databases. FIG. 7 shows a user interface 127-1 associated with company A's digital label database 110-1 and a user interface 127-2 associated with company B's digital label database 110-2.

The API(s) 120 can be configured to select the appropriate user interface to be displayed in a given context. For example, when the user of a mobile computing device 116 uses a reader 117 to read a machine-readable object 113 on a printed physical label 108, the specific user interface that will be displayed can depend on which digital label database the printed physical label 108 (and the corresponding item 106) corresponds to. Company A's user interface 127-1 can be displayed for user interactions with digital labels 109-1 in company A's digital label database 110-1, while Company B's user interface 127-2 can be displayed for user interactions with digital labels 109-2 in company B's digital label database 110-2. In some embodiments, the user interface can include a company-specific landing page, which can be displayed when the informational content 114 from that company's digital labels 109 are displayed to a user.

For the sake of simplicity, the example shown in FIG. 7 only includes two digital label databases 110-1, 110-2 corresponding to two different companies. Of course, the specific number of digital label databases 110-1, 110-2 shown in this example should not be interpreted as limiting the scope of the present disclosure. Those skilled in the art will recognize that the techniques disclosed herein can be used to create many more digital label databases corresponding to a large number of different companies.

Figure 8:
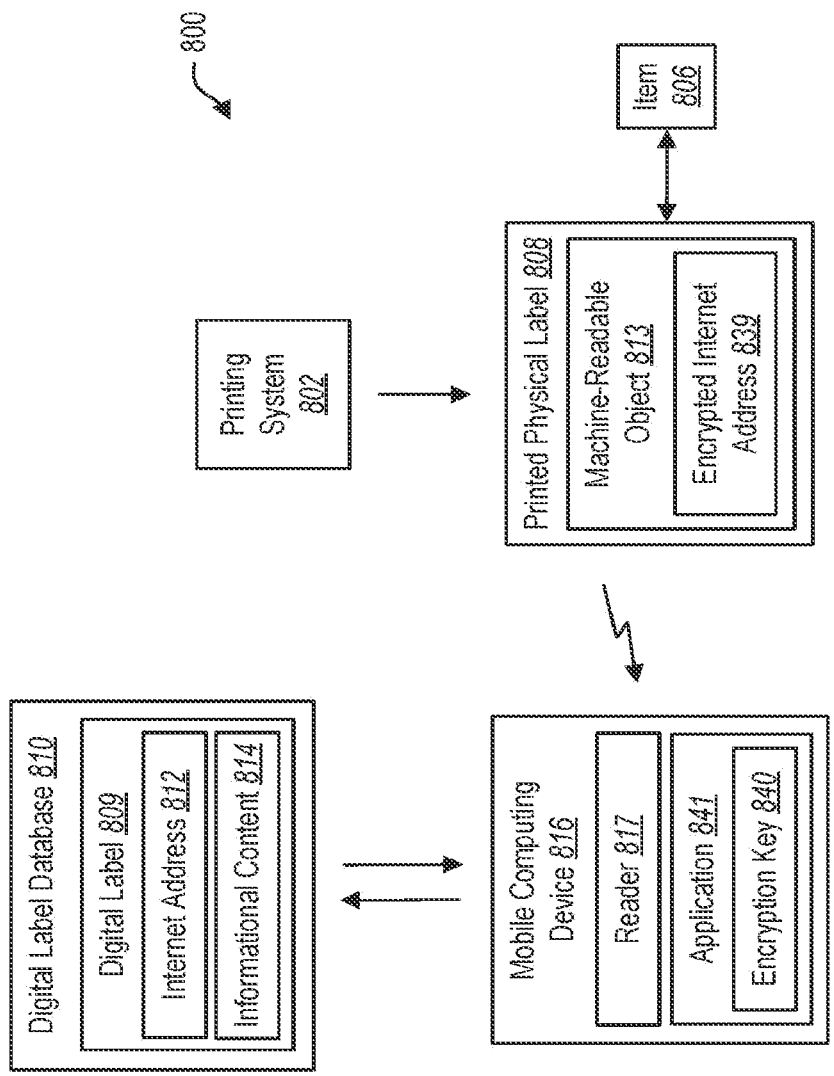
FIG. 8 illustrates aspects of another system in which the techniques disclosed herein can be utilized.

FIG. 8 illustrates aspects of another system 800 in which the techniques disclosed herein can be utilized. The system 800 can be similar to the system 100 shown in FIG. 1, except as indicated below.

In the depicted system 800, the printing system 802 can be configured to encrypt the Internet address 812 of the digital label 809 prior to generating the machine-readable object 813 on the printed physical label 808. Thus, the machine-readable object 813 includes an encrypted Internet address 839.

The encrypted Internet address 839 of the digital label 809 can be obtained by using a reader 818 to read the machine-readable object 813 on the printed physical label 808. In some embodiments, the reader 818 can be included within a mobile computing device 816.

An encryption key 840 is needed in order to decrypt the encrypted Internet address 839. In some embodiments, the encryption key 840 can be included within an application 841 running on the mobile computing device 816. When the reader 818 reads the machine-readable object 813 and obtains the encrypted Internet address 839, the application 841 uses the encryption key 840 to decrypt the encrypted Internet address 839 and obtain the Internet address 812 of the digital label 809 in the digital label database 810. The application 841 can then use the Internet address 812 to request the informational content 814 associated with the digital label 809, as described above.

Definitions of some terms and phrases used in the foregoing discussion will now be provided.

As used herein, the term "barcode" refers to an optical machine-readable representation of information. The term "barcode" encompasses linear or one-dimensional (1D) barcodes and two-dimensional (2D) barcodes. 1D barcodes can represent data by varying the widths, spacings, and sizes of parallel lines. Some non-limiting examples of 1D barcode symbologies include UPC-A, UPC-E, and Code 128. 2D barcodes can use rectangles, dots, hexagons, and other patterns to represent data. Some non-limiting examples of 2D barcode symbologies include QR code, Data Matrix, Aztec, and Maxicode.

The process of identifying or extracting information from a barcode can be referred to as reading (or scanning) a barcode. The term "barcode reader" refers to any device that is capable of reading barcodes. There are many different types of barcode readers in existence today. Some examples of barcode readers include camera-based barcode readers, laser readers, charge-coupled device (CCD) readers (which are alternatively known as light-emitting diode (LED) readers), and pen-type readers (which are alternatively known as wand-type readers). Barcode readers may be handheld devices or fixed-mount devices that provide hands-free operation at a stationary point.

A barcode reader can be a dedicated hardware device that is specifically designed for barcode reading. This type of device may be referred to as a dedicated barcode reader (or scanner). Alternatively, a barcode reader can be a multipurpose device that can perform a plurality of functions, including barcode reading. For example, a barcode reader can be a general-purpose computing device (e.g., a smartphone, a tablet computer) that includes a camera and that is equipped with software for reading barcodes.

The term "ID tag" refers to an electronic identification device. Some examples of ID tags include near-field communication (NFC) tags and radio-frequency identification (RFID) tags. The process of identifying or extracting information from an ID tag can be referred to as reading an ID tag. A device that reads ID tags may be referred to herein as an ID tag reader. In some embodiments, an ID tag includes a radio transponder. An ID tag can be configured so that when the transponder is triggered by an electromagnetic interrogation pulse from a nearby ID tag reader, the ID tag transmits data back to the ID tag reader.

As used herein, the term "substantially" should be interpreted to mean "to a great extent or degree." In some embodiments, two events occur at substantially the same time if they occur within one minute of each other. In other embodiments, two events occur at substantially the same time if they occur within five minutes of each other. In other embodiments, two events occur at substantially the same time if they occur within thirty minutes of each other. In other embodiments, two events occur at substantially the same time if they occur within one hour of each other. In other embodiments, two events occur at substantially the same time if they occur within one day of each other.

The techniques disclosed herein can be implemented in hardware, software, firmware, or any combination thereof, unless specifically described as being implemented in a specific manner.

At least some of the features disclosed herein have been described as instructions that are executable by a processor to perform various operations, actions, or other functionality. The term "instructions" should be interpreted broadly to include any type of computer-readable statement(s). For example, the term "instructions" may refer to one or more programs, routines, sub-routines, functions, procedures, modules etc. "Instructions" may comprise a single computer-readable statement or many computer-readable statements. In addition, instructions that have been described separately in the above description can be combined as desired in various embodiments.

The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term "memory" may refer to various types of processor-readable media such as random-access memory (RAM), read-only memory (ROM), non-volatile random-access memory (NVRAM), programmable read-only memory (PROM), erasable programmable read-only memory (EPROM), electrically erasable PROM (EEPROM), flash memory, magnetic or optical data storage, registers, etc. Memory is said to be communicatively coupled to a processor if the processor can read information from and/or write information to the memory. Memory that is integral to a processor is communicatively coupled to the processor.

The term "communicatively coupled" refers to coupling of components such that these components are able to communicate with one another through, for example, wired, wireless, or other communications media. The term "communicatively coupled" can include direct, communicative coupling as well as indirect or "mediated" communicative coupling. For example, a component A may be communicatively coupled to a component B directly by at least one communication pathway, or a component A may be communicatively coupled to a component B indirectly by at least a first communication pathway that directly couples component A to a component C and at least a second communication pathway that directly couples component C to component B. In this case, component C is said to mediate the communicative coupling between component A and component B.

Any communication interface(s) described herein can be based on wireless communication technology and/or wired communication technology. Some examples of communication interfaces that are based on wireless communication technology include a Bluetooth wireless communication adapter, a wireless adapter that operates in accordance with an Institute of Electrical and Electronics Engineers (IEEE) 802.11 wireless communication protocol, and an infrared (IR) communication port. Some examples of communication interfaces that are based on wired communication technology include a Universal Serial Bus (USB) and an Ethernet adapter.

The term "user interface" can refer to any components (including hardware and/or software components) of a system or a device that enable a user to control and/or interact with one or more features of the system or device.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements.

The phrase "based on" does not mean "based only on," unless expressly specified otherwise. In other words, the phrase "based on" describes both "based only on" and "based at least on."

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

References to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A system for facilitating the creation of digital labels to supplement physical labels, the system comprising:
   a processor;
   memory communicatively coupled to the processor;
   a digital label database stored in the memory, the digital label database comprising a plurality of digital labels, wherein a digital label in the digital label database comprises:
      an item identifier that is uniquely associated with an item;
      an Internet address, wherein the item comprises a printed physical label, and wherein the printed physical label comprises a machine-readable object that comprises the Internet address;
      additional item information that is not included on the printed physical label; and
      a first modification rule that defines what users are permitted to modify the digital label; and
   instructions that are stored in the memory and executable by the processor to:
      receive a first request to modify the digital label, the first request comprising the item identifier and modification instructions identifying requested changes that should be made to the digital label; and
      confirm, prior to granting the first request, that the first modification rule is not violated by authenticating a user that sent the first request.

2. The system of claim 1, wherein the additional item information within the digital label comprises:
   static information that does not change; and
   dynamic information that can be changed when one or more modification rules have been satisfied.

3. The system of claim 2, wherein:
   the digital label additionally comprises a second modification rule indicating that the static information cannot be changed and that the dynamic information can be changed; and
   the instructions are additionally executable by the processor to confirm, prior to granting the first request, that the second modification rule is not violated by determining that none of the requested changes would affect the static information.

4. The system of claim 3, wherein the instructions are additionally executable by the processor to:
   receive a second request to modify the digital label; and
   deny the second request in response to determining that the second request would affect the static information.

5. The system of claim 1, wherein:
   the printed physical label comprises item information associated with the item; and
   the digital label further comprises the item information that is included on the printed physical label.

6. The system of claim 1, wherein:
   the system is implemented within a cloud computing infrastructure;
   the first request is received from a label printing module that is external to the cloud computing infrastructure; and
   the label printing module sends the first request at substantially the same time as the label printing module creates a print job for the printed physical label.

7. The system of claim 1, further comprising at least one application programming interface (API) that enables the label printing module to create and update digital labels in the digital label database, wherein the at least one API facilitates the creation of different user interfaces associated with different digital label databases.

8. The system of claim 1, further comprising:
   a web server that is configured to receive and respond to requests for digital labels in the digital label database;
   a reader that is configured to read the machine-readable object in the printed physical label and obtain the Internet address corresponding to the digital label; and
   a web browser that obtains informational content associated with the digital label by sending a request that includes the Internet address to the web server.

9. A system for facilitating the creation of digital labels to supplement physical labels, the system comprising:
   a processor;
   memory communicatively coupled to the processor;
   a digital label database stored in the memory, the digital label database comprising a plurality of digital labels, wherein a digital label in the digital label database comprises:
      an item identifier that is uniquely associated with an item comprising a printed physical label;
      an Internet address, wherein the printed physical label comprises a machine-readable object that comprises the Internet address;
      additional item information that is not included on the printed physical label; and
      a modification rule defining a condition that must be satisfied for modification of the digital label to be permitted; and
   instructions that are stored in the memory and executable by the processor to:
      receive a request to modify the digital label, the request comprising the item identifier and modification instructions identifying requested changes that should be made to the digital label;
      determine whether the request satisfies the condition associated with the modification rule; and
      make the requested changes to the digital label only after confirming that the condition associated with the modification rule has been satisfied.

10. The system of claim 9, wherein:
    the modification rule defines what users are permitted to modify the digital label; and
    the instructions are additionally executable by the processor to make the requested changes to the digital label only after authenticating a user that sent the request.

11. The system of claim 9, wherein:
the modification rule indicates that (i) a first portion of informational content in the digital label comprises static information that cannot be changed, and (ii) a second portion of the informational content in the digital label comprises dynamic information that can be changed; and
the instructions are additionally executable by the processor to make the requested changes to the digital label only after confirming that none of the requested changes would affect the static information.

12. The system of claim 9, wherein:
the system is implemented within a cloud computing infrastructure; and
the request is received from a label printing module that is external to the cloud computing infrastructure.

13. The system of claim 12, wherein the label printing module sends the request at substantially the same time as the label printing module creates a print job for the printed physical label.

14. The system of claim 12, further comprising at least one application programming interface (API) that enables the label printing module to create and update digital labels in the digital label database, wherein the at least one API facilitates the creation of different user interfaces associated with different digital label databases.

15. The system of claim 9, further comprising:
a web server that is configured to receive and respond to requests for digital labels in the digital label database;
a reader that is configured to read the machine-readable object in the printed physical label and obtain the Internet address corresponding to the digital label; and
a web browser that obtains informational content associated with the digital label by sending a request that includes the Internet address to the web server.

16. A method for supplementing a printed physical label associated with an item, the printed physical label comprising a machine-readable object, the machine-readable object comprising an Internet address, the method comprising:
creating a digital label in a digital label database that comprises a plurality of other digital labels, the digital label comprising (i) an item identifier that is uniquely associated with the item, (ii) the Internet address, (iii) additional item information that is not included on the printed physical label, and (iv) a modification rule defining a condition that must be satisfied for modification of the digital label to be permitted;
receiving a request to modify the digital label, the request comprising the item identifier and modification instructions identifying requested changes that should be made to the digital label;
determining whether the request satisfies the condition associated with the modification rule; and
making the requested changes to the digital label only after confirming that the condition associated with the modification rule has been satisfied.

17. The method of claim 16, wherein:
the modification rule defines what users are permitted to modify the digital label; and
the method further comprises making the requested changes to the digital label only after authenticating a user that sent the request.

18. The method of claim 16, wherein:
the modification rule indicates that (i) a first portion of informational content in the digital label comprises static information that cannot be changed, and (ii) a second portion of the informational content in the digital label comprises dynamic information that can be changed; and
the method further comprises making the requested changes to the digital label only after confirming that none of the requested changes would affect the static information.

19. The method of claim 16, wherein:
the digital label database is implemented within a cloud computing infrastructure; and
the request is received from a label printing module that is external to the cloud computing infrastructure.

20. The method of claim 19, wherein the label printing module sends the request at substantially the same time as the label printing module creates a print job for the printed physical label.

* * * * *